United States Patent
Fellman

(10) Patent No.: US 8,924,869 B2
(45) Date of Patent: Dec. 30, 2014

(54) SERVICE FOR GENERATION OF CUSTOMIZABLE DISPLAY WIDGETS

(76) Inventor: Barry Fellman, Miami, FL (US)

(*) Notice: Subject to any disclaimer, the term of this patent is extended or adjusted under 35 U.S.C. 154(b) by 2143 days.

(21) Appl. No.: 11/504,361

(22) Filed: Aug. 14, 2006

(65) Prior Publication Data

US 2007/0038934 A1 Feb. 15, 2007

Related U.S. Application Data

(60) Provisional application No. 60/707,780, filed on Aug. 12, 2005.

(51) Int. Cl.
- *G06F 3/048* (2013.01)
- *G06F 9/44* (2006.01)
- *G06F 3/00* (2006.01)

(52) U.S. Cl.
CPC .................... *G06F 9/4443* (2013.01)
USPC .......................................... 715/762

(58) Field of Classification Search
CPC ................................................ G06F 9/4443
USPC .......................................... 715/762
See application file for complete search history.

(56) References Cited

U.S. PATENT DOCUMENTS

| | | | |
|---|---|---|---|
| 5,786,815 | A | 7/1998 | Ford |
| 5,896,532 | A | 4/1999 | Blewett |
| 6,237,004 | B1 | 5/2001 | Dodson et al. |
| 6,469,714 | B2 | 10/2002 | Buxton et al. |
| 2002/0054148 | A1 | 5/2002 | Okada |
| 2002/0130900 | A1 | 9/2002 | Davis |
| 2003/0160822 | A1 | 8/2003 | Belz et al. |
| 2003/0164859 | A1 | 9/2003 | Evans |
| 2003/0206195 | A1 | 11/2003 | Matsa et al. |
| 2003/0222918 | A1 | 12/2003 | Coulthard |
| 2004/0216042 | A1 | 10/2004 | Consolatti et al. |
| 2005/0039134 | A1 | 2/2005 | Wiggeshoff |
| 2005/0049989 | A1 | 3/2005 | Kaminsky et al. |
| 2005/0060724 | A1 | 3/2005 | Skinner et al. |
| 2005/0125787 | A1 | 6/2005 | Tertitski et al. |
| 2005/0172239 | A1 | 8/2005 | Liu et al. |

OTHER PUBLICATIONS

Maria Langer, "Mac OS X 10.4 Tiger: Visual QuickStart Guide," Apr. 2005, Peachpit Press, Chapter 10.*
Vargish, "Remind Widget," May 2005.*
TVWeather, "Weather View 32," Jul. 2000.*
Langer in view of LookAndFeel, "YAWW," 2000.*
David McAmis, "Microsoft Exchange Server 2003 Delta Guide," Dec. 2003.*
Steve Johnson, "Show Me Microsoft Office Outlook 2003," Sep. 2003.*
en.wikipedia.org/wiki/Hotmail, Jan. 2004.*

(Continued)

*Primary Examiner* — William Bashore
*Assistant Examiner* — Daniel Um
(74) *Attorney, Agent, or Firm* — Knobbe, Martens, Olson & Bear, LLP

(57) ABSTRACT

A system for presenting dynamically generated images in a computing environment is provided. The system generates visual elements, such as widgets, for example, by combining image data, user-defined data which may include alphanumeric data, and real-time data indicative of current conditions. The widgets may be implemented in a purely server-side application environment which alleviates the need for any installation of client software on the client computing device.

30 Claims, 15 Drawing Sheets

(56) References Cited

OTHER PUBLICATIONS

PostApp, "PostApp Funded to Pioneer Widgetbox Web Widget Marketplace," Jun. 23, 2006.*
Konfabulator, http://www.konfabulator.com, Dec. 2004.*
Lisa Kenyon, "Widgets," The University of Texas at Austin, Fall 2002.*
Istari, "Will Gadgets trump widgets?" Jul. 2005.*
Borries Software, "Konfabulator Widgets for Mac OS X What is Konfabulator?" Apr. 2003.*

* cited by examiner

US 8,924,869 B2

SERVICE FOR GENERATION OF CUSTOMIZABLE DISPLAY WIDGETS

CROSS-REFERENCE TO RELATED APPLICATIONS

The application claims the benefit of U.S. Provisional Patent Application No. 60/707,780, entitled "SYSTEM FOR PRESENTING DYNAMICALLY GENERATED IMAGES" and filed on Aug. 12, 2005, the disclosure of which is hereby incorporated by reference in its entirety.

BACKGROUND OF THE INVENTION

1. Field of the Invention

This application relates to graphical user interface elements in computing devices. More specifically, this application relates to a system and method for presenting information in a visually compelling manner to effectively convey the information in a static or dynamic environment.

2. Description of the Related Art

Visual images have long been used to convey ideas and information more effectively than by written words or numerals alone. As techniques have been developed allowing for the relatively inexpensive cost of creating and reproducing images, image content has become more relevant to communication. Images have become more pervasive in our day-to-day lives as a result of techniques developed to reproduce images for mass distribution. Halftone and four-color reproduction processes have allowed the printing press to present images to a wide public. Photographic film and associated projection techniques have formed the basis of the movie industry which presents large scale moving images to hundreds of millions of viewers around the world. Broadcast media such as television and cable present an even larger quantity of images to a growing international public comprising individuals who spend on average several hours each day viewing these images. With the development of inexpensive consumer video cameras and editing equipment many individuals are now creating their own moving images, which are enjoying widespread distribution on broadcast media and the Internet. As society has become more image-dependent, information presented in a text-based or non-graphical manner begins to have diminished impact and effectiveness. Information that might have been otherwise effectively conveyed textually or numerically in the past is often now ignored in a more image-focused society.

Although society has become more image-based, developments in computer technology have also resulted in an increase in the amount of data that is relevant and available in people's lives. Although this increase in available data is intended to provide the benefit of increased knowledge, the sheer volume of data available makes it increasingly difficult to present the data in a visually compelling manner. Information that a few years ago might have otherwise been effectively conveyed with text, numerical characters and limited graphics, might be ignored today without being presented in a more visual appealing way. Therefore, what is needed are systems and methods that allow accurate and timely data to be presented in a visually compelling manner.

SUMMARY

The system, method, and devices of the present invention each have several aspects, no single one of which is solely responsible for its desirable attributes. Without limiting the scope of this invention, several of its features will now be discussed briefly.

In one embodiment, a system for defining a visual element in a display interface is provided. The system may include a data storage system for storing visual element defining data. The visual element defining data may comprise image data having a base image component and other image components. The defining data may also include alphanumeric data representing information to be conveyed in the defined visual elements. The defining data may further include real-time data indicative of current conditions. The system may also include a generation module configured to generate the visual element based on the defining data, and further may include a network interface module configured to receive client requests related to the defined visual element and send the visual element defining data that is responsive to the request.

BRIEF DESCRIPTION OF THE DRAWINGS

In this description, reference is made to the drawings wherein like parts are designated with like numerals throughout.

DETAILED DESCRIPTION OF CERTAIN INVENTIVE EMBODIMENTS

Certain embodiments described herein provide for the display of visual elements for conveying information in a computing device. In one or more embodiments, aspects of the invention may provide a system that allows users to create a customized web page or desktop computing environment. Users are able to access a website and setup a personalized account to use the website. The operator of the website provides the user with various widgets that may be selected by the user and placed in their user interface environment. The widget environment may utilize widget containers which provide a framework for extending specific functionality globally across certain sets of widgets, while enabling each individual widget to address functional processes singularly. The operator of such websites may be referred to as a widget service provider.

In certain embodiments, the system may be based on a web services model. The web services model may be advantageous in that it provides easy and widespread distribution targeting the widely available devices that have web browser capability. A web services model may further provide for the easy incorporation of additional services and plug-ins which may be developed by website members and by third parties. The web services model may also provide for development in other technologies such as AJAX or simple HTML, while still allowing access to most services through system API's.

Some implementations provide for user access to the system via a web interface on a web browser. Some widgets may be programmed as Flash applications or applets that run within an active browser window on the device. Users may be able to sent data to the system via HTTP post commands, while the widget service provider may configure web services that update the user's personalized page and associated widgets in response to user device requests and in response to changing data values.

Although the various embodiments herein are described in the context of a web services model, it will be appreciated that other embodiments may include desktop widgets which are persistent on a user's computing device rather than integrated into a browser window.

Figure 1:
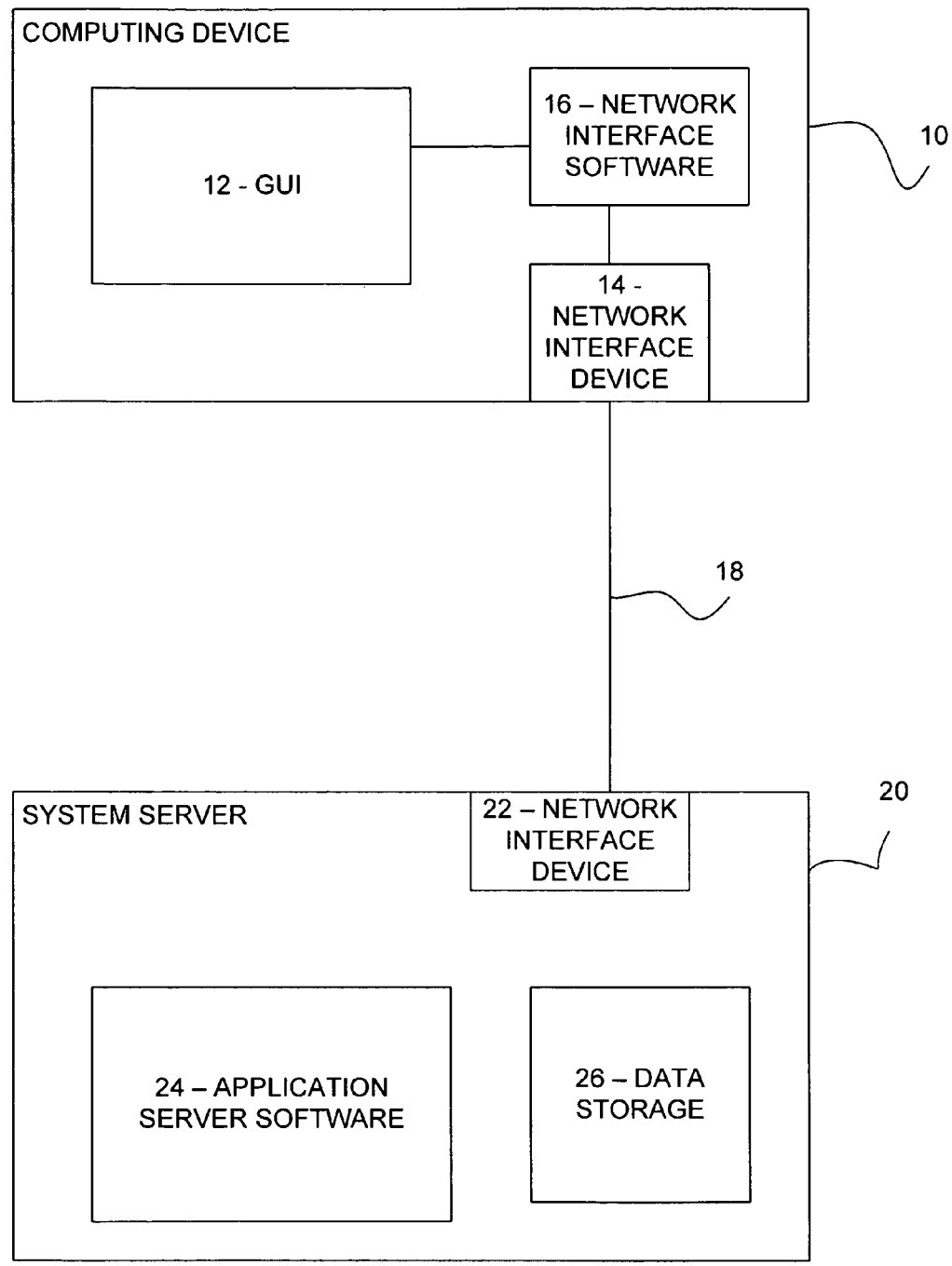
FIG. 1 provides a high level diagram illustrating a network computing environment suitable for practicing certain embodiments.

FIG. 1 provides a high level diagram illustrating a network computing environment suitable for practicing certain embodiments of the invention. The network computing environment shown in FIG. 1 includes a computing device 10. The computing device 10 may, for example, be a personal computer, a cell phone, a PDA, a Bluetooth-enabled device, or any other browser-enabled device that includes a graphical user interface 12. The graphical user interface 12 may display information to the user of the computing device 10 in a graphical, as opposed to purely textual format. The computing device 10 may also be capable or configured to communicate with other computing devices over a computer network 18 via a network interface device 14. In one or more embodiments, the network 18 may be the Internet. The network interface device 14 may be some type of hardware device, such as a network interface card (NIC) for example, which is capable of communicating with the network 18. In some embodiments, the network interface device 14 may provide a wired connection. In other embodiments, the connection may be wireless. In still other embodiments, the connection between the network interface device 14 and the network 18 may be a combination of wired and wireless elements.

The network interface device 14 may also be in communication with network interface software 16. In one or more embodiments, the network interface software 16 may be web browsing software such as Internet Explorer, Safari, or Firefox. The network interface software 16 may form a portion of the graphical user interface 12, and may allow users to easily access the functionality of the software. As used herein, a computing device 10 may refer to any type of device that is capable of being configured to access a network 18 and to communicate over the network utilizing network interface software.

The computing device 10 may communicate over the network 18 with a server 20. The server 20 may be a web/application server that is configured to receive requests from the web browsing software 16 and send responses to the computing device 10 in response to the received requests. The server 20 may include a network interface device 22 which allows the server 20 to communicate over the network 18. The server 20 may further include application server software 24 which is configured to receive and respond to requests made to the server 20 via the network 18. The server 20 may also include data storage 26. The data storage 26 may be used to store data related to the application server by the application server 24. The data storage 26 may be in the form of a database or a database management system. Although the embodiment shown in FIG. 1 shows the data storage 26 as being on the same device as the server 20, one of skill in the art will appreciate that the various tasks performed by the server 20 may be divided on several machines.

In one or more embodiments, the server 20 provides functionality for users to define customized display elements or objects that can be displayed in a graphical user interface 12 without requiring any installation of specialized software on the user's computer 10. The objects defined and displayed preferably include sounds, hypertext, and visual images. The objects may be implemented utilizing server-side application technologies, and they may be further implemented using a lightweight application protocol such as applets developed using Macromedia Flash to ensure speed, compatibility and reliability. In other embodiments, the objects may be built using Java or JavaScript.

These display elements may be referred to as widgets. As used herein, a widget is an interface component with which a computer user interacts in a graphical user interface. In some embodiments, a widget may take the form of a small desktop application that provides easy access to frequently used functions and provides some visual information to the user regarding the data returned by the functions.

Figure 2:
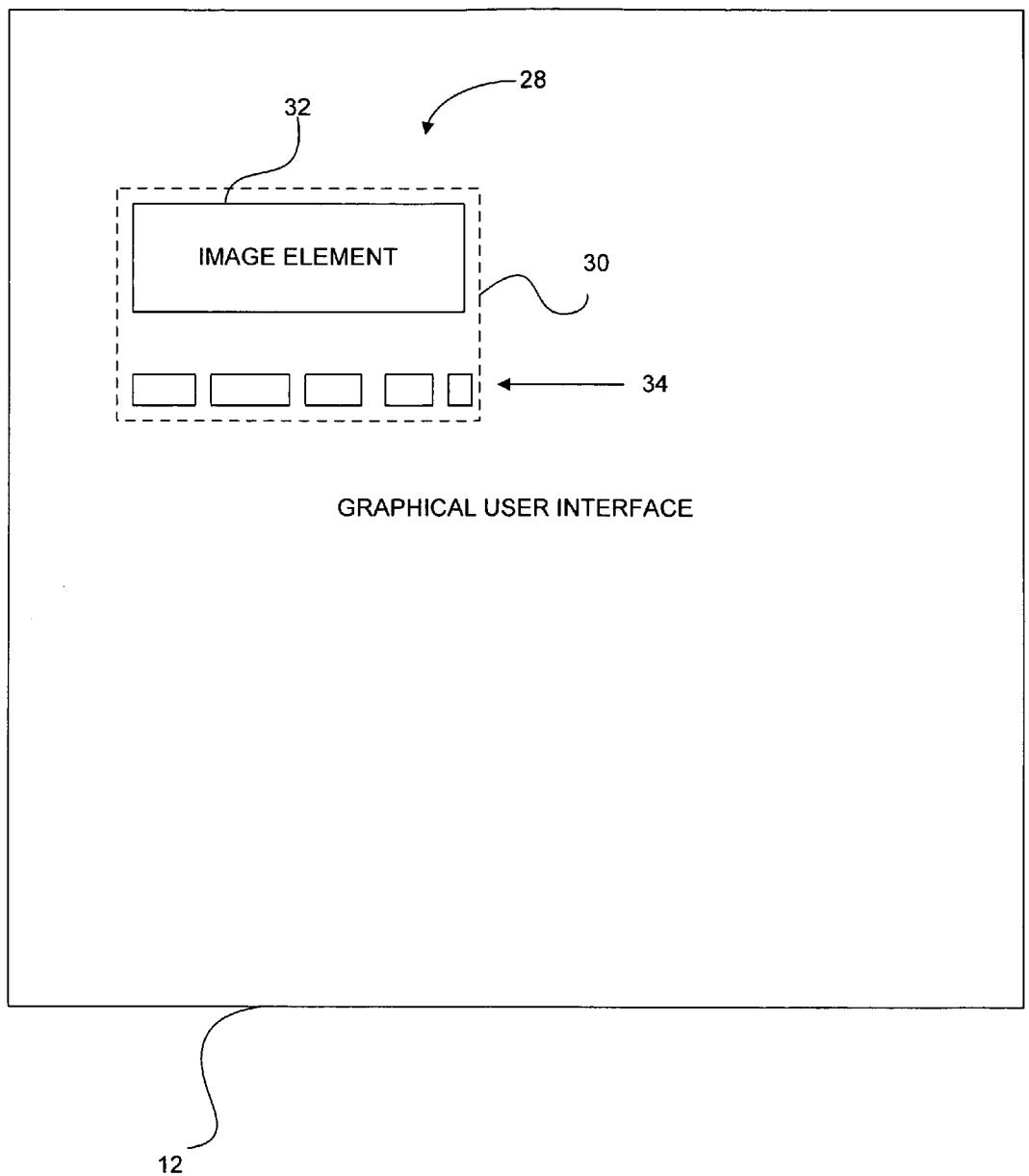
FIG. 2 is an example of a visual element displayed in the display interface from FIG. 1.

FIG. 2 provides an illustration of a visual display element 28 that may be displayed in the graphical user interface 12 as described in connection with FIG. 1. Within the display element is a display element container 30 and a display element application (not shown). The display element 28 may simulate the functionality of an application window that typically appears on the desktop of a computing device 10. Alternatively, it may simulate the desktop itself of the computing device. The display element 28, however, runs within a browser 16 window, and does not include an installed application within the client computing device 10.

The display element container 30 may, in some embodiments, be a widget container 30. The widget container 30 may separate the user interface functionality of the widget 28 and the widget application from the platform on which it runs. The widget container 30 may include a widget image element 32, which may be some visual component of the widget. The widget image element 32 may include a base image component which may be an image with characteristics that remain generally constant each time the widget is displayed. The image element 32 may also include sub-images which may be visual components that are combined with the base image along with real-time data and/or other user-specified alphanumeric data to produce a dynamically generated widget image in a manner that will be discussed in further detail below. Thus, the image element 32 may be generated by both the base image and by the widget application using specified data parameters.

The display element container 30 may also include container controls 34. The container controls 34 may be used to provide a framework within which a plurality of widgets 28 may be provided with a core set of GUI functionality. The widget container controls 34 may be insulated from the application portion of the widget so that the basic characteristics of the widget 28 are not changed. Various container controls 34 may be available. For example, in one embodiment, the controls 34 may include a drag and drop positioning handle which allows the user to move the widget 28 easily around the graphical user interface 12. The controls 34 may further include a transparency slider which may provide the ability to change the granularity of the images displayed on the screen. In some embodiments, the controls 34 may further include a minimize button that hides the widget without closing it. The minimize button may be useful when the user does not want the widget 28 on the GUI 12, but still wishes for the application elements of the widget 28 to continue executing in the background. The controls 34 may further include a close button that allows the user to close the widget 28 completely (as opposed to minimizing), and a scale control, which allows a user to resize the widget 28 within the graphical user interface. The controls 34 may also include a mouse-over feature that displays text when the mouse pointer passes over an area of the widget.

As noted above, the display elements 28 may include base images, and other image components. The other image components may be defined in part by external data received by the server 20 and sent to the computing device 10 over the network 18. The external data may include pre-defined image data, real-time data, and/or alphanumeric data.

Figure 3A:
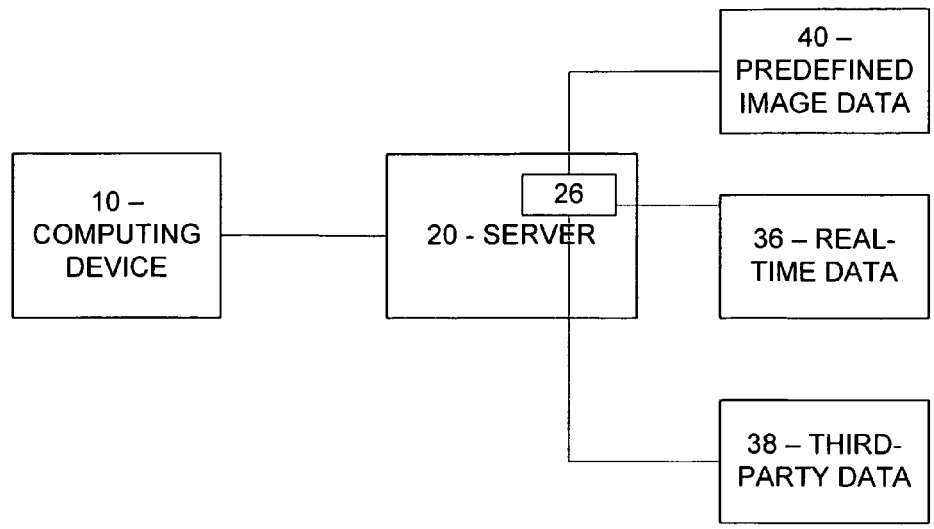
FIGS. 3A and 3B provide a more detailed view of the environment of FIG. 1, including single server and dual server configurations.

In some configurations, the server 20 may communicate with external data sources to obtain the data used to help define widget images. Referring now to FIG. 3, a more detailed view of the general configuration of FIG. 1 is provided to illustrate how external data sources may be accessed by the server 20. FIG. 3A provides an example of a single server configuration that may be used to gather external data for use by the widget applications 28. As shown in FIG. 3A, a client computing device 10 accesses the network 18 to connect to the server 20. The server 20 includes data storage 26. The server 20 may access various external data sources. The server 20 may access real-time data 36 from an external peripheral device and stored the data in the database 26. The server 20 may also access third-party provider data 38 for storage in the database store 26. The server 20 may be further configured to receive pre-defined image data 40 which may be used to provide additional visual components to the visual elements 28. The pre-defined image data 40 may include user generated image data such as photographs or videos. Each of the real-time data, the third-party provider data 38 and the pre-defined image data 40 will be discussed in further detail below in connection with FIGS. 10, 12, and 14.

Figure 3B:
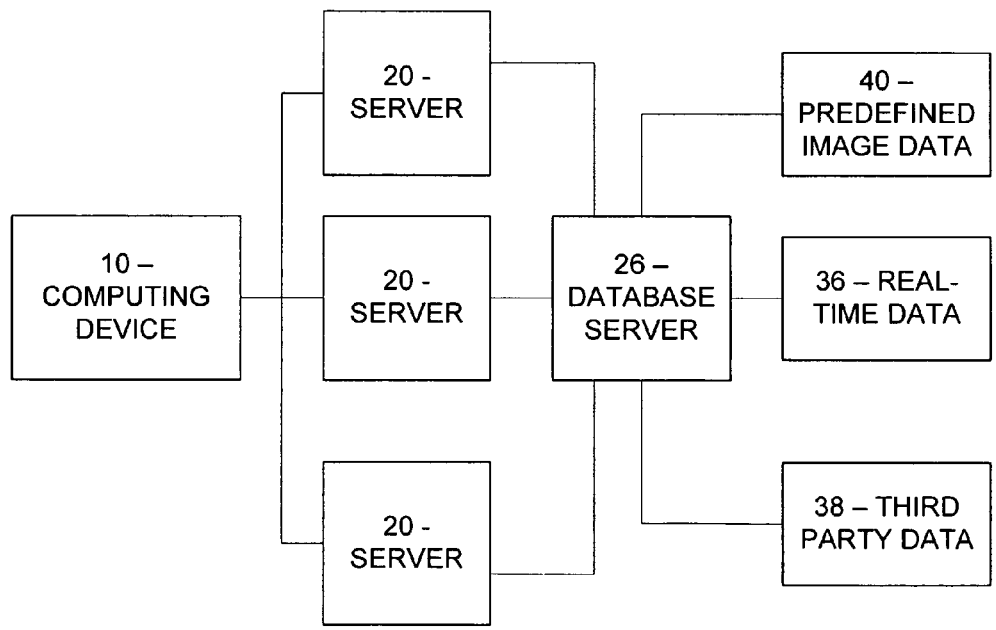

Referring now to FIG. 3B, an example of a dual server configuration of the environment from FIG. 1 is provided. The environment is similar to that shown in FIG. 3A, except that the data store 26 runs on a separate server from one or more system/application servers 20. Thus, the database server 26 communicates with the external data sources to receive data which is stored and sent to the server 20 where it may be utilized by the widget applications to define widget images to be displayed on the GUI 12 of the computing devices 10.

In some embodiments, the widget service provider may operate a "backend" system API is which is developed in JAVA, for stability and flexibility in an object-oriented environment. Requested widget data and services are retrieved from the system via http requests. For example the Flash application for an active widget may make the request: http://domain.tld/action=getWidgetList&user=7504. Data may also be retrieved from third party web based resources by direct http request to the desired resource, for example a third party content widget such as a UPS Package Tracker widget may retrieve relevant data directly from the UPS website. These particular features will be discussed in further detail below. As the system uses a web services model, front-end development in other technologies such as AJAX or simple html can be accommodated while allowing access to existing back-end system services through the API. Some widgets rely fully on the API, and others operate independently from the API, for example third party content widgets.

Figure 4A:
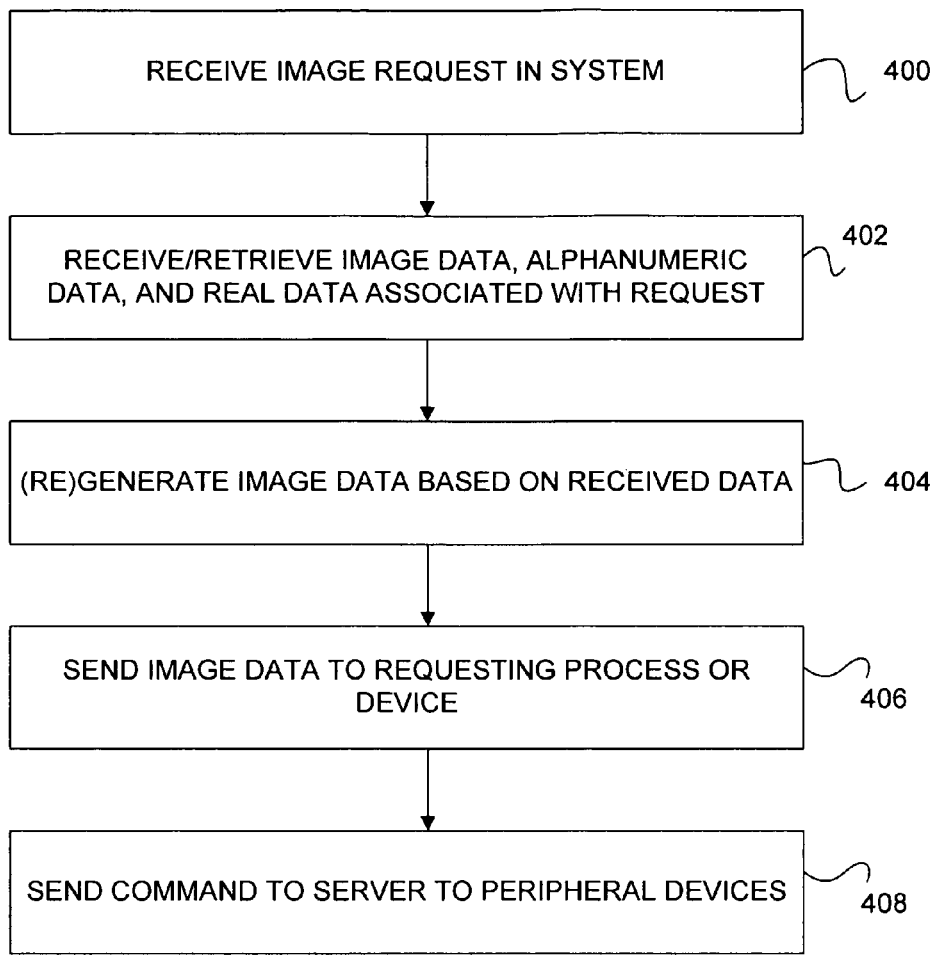
FIGS. 4A and 4B provide examples of the how visual elements may be generated in the environment of FIG. 1 in accordance with various embodiments.
Figure 4B:
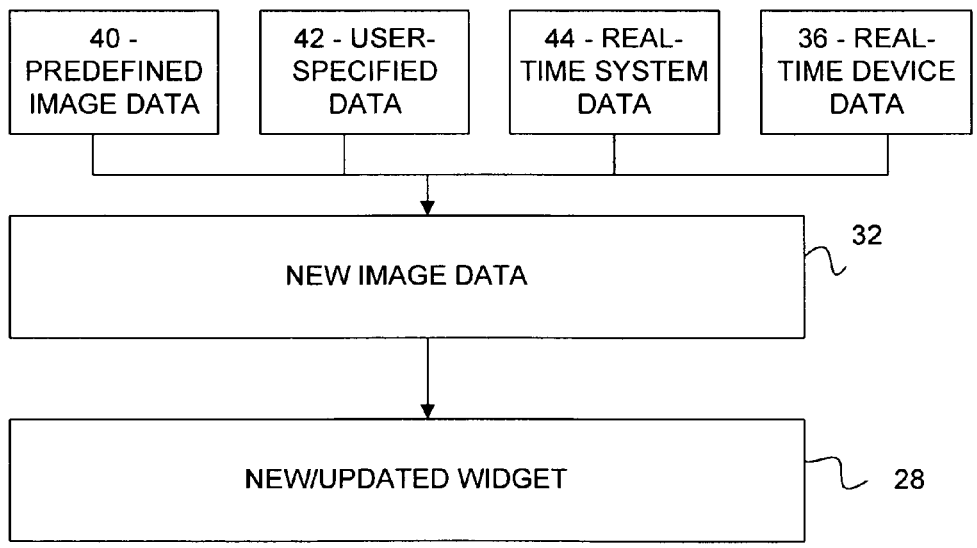

As noted above, visual elements/widgets 28 may be generated on the system server 20 by utilizing base widget image elements 32 and combining them with other data to create the widget 28. FIGS. 4A and 4B provide examples of how widgets 28 may be created and/or updated by the server 20. FIG. 4A is a flowchart that describes how the server 20 may be configured to create the widget 28.

At block 400, the server 20 receives a request to display an image which is stored in the server 20. The request may be sent from a client computing device 10 wherein the user wishes to define a widget to display within the browser software 16. The image request may include various parameters that allow the server 20 to identify the data relevant to the image request. The server 20 may utilize these parameters at block 402 to retrieve image data, alphanumeric data, real-time data, and other data associated with the user request. As discussed previously, these data sources may be external to the server 20, and may be accessed via the network 18. Next, at block 404, the image data to be displayed in the image element 32 of the widget 28 may then be generated (or regenerated for preexisting widgets) by the server 20 based on the data received by the server 20. The process then moves to block 406, where the generated image data is sent to the client device 10 to be placed in the image element 32 of the widget 28. Next, at block 408, commands may be issued to, or actions may be taken at, the server 20, the peripheral devices, or the user device.

Referring now to FIG. 4B, a data flow diagram illustrates the path that the different types of data may take toward incorporation within the image element 32 of a widget 28. As shown in the dataflow diagram, real-time device data 36, predefined image data 40, user-specified data 42 and real-time system (i.e., computing device 10) data 44 may be combined to generated new image data 32. This newly generated image 32 is then passed to the widget 28 so that the updates to the data are reflected in its display.

Figure 5:
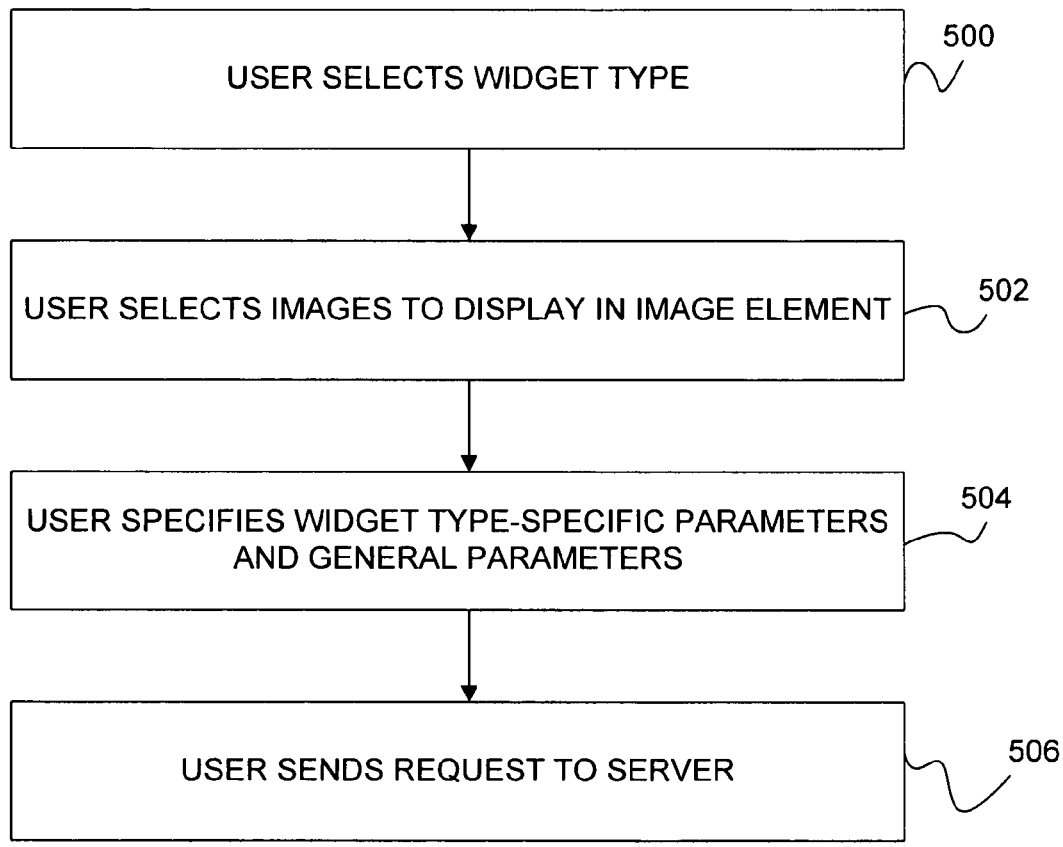
FIG. 5 provides an illustration of a process by which users can define visual elements such as widgets.

The process described in FIGS. 4A and 4B is described from the standpoint of the server 20. FIG. 5 provides a view of the corresponding process that takes place on the client computing devices 10 when a widget 28 is created or updated. At block 500, the user selects a widget type that he wishes to display on his computing device 10. Next, at block 502, the user selects images to display in the within the image element 32 of the widget 28. These images may include a base image, for example. The process then moves to block 504, where the user specifies data and parameters to associate with the widget 28. For example, in the case of a widget that is a countdown widget that displays a countdown of days to a birthday, the user may specify a birthday to which the server 20 and the widget 28 will countdown. Once the user has specified the data parameters, he may then send the request from the client computing device 10 over the network 18 to the server 20 at block 506.

In certain embodiments, users may be able to select and configure widgets from a fixed number of predefined color themes. Each theme may specify five different color groups:
  Widget text color
  Widget background color
  Headline text color (title on the frame)
  Headline information color (frame of the window containing the widget)
  Desktop background color Users may also utilize drag and drop functionality provided in the system that allows user to change the layout of selected widgets on user's main page. When user performs update or logs out of the service, layout is saved. Small icon for each active widget is located at bottom of page. Left click controls whether widget image is made visible on page. Active widgets are visible at the bottom of the user's web page, and emulate the same behavior as a windows style desktop application with controls to drag and drop, minimize or close widget. Moreover, widgets may be provided with mouseover capabilities on an individualized basis.

Figure 6:
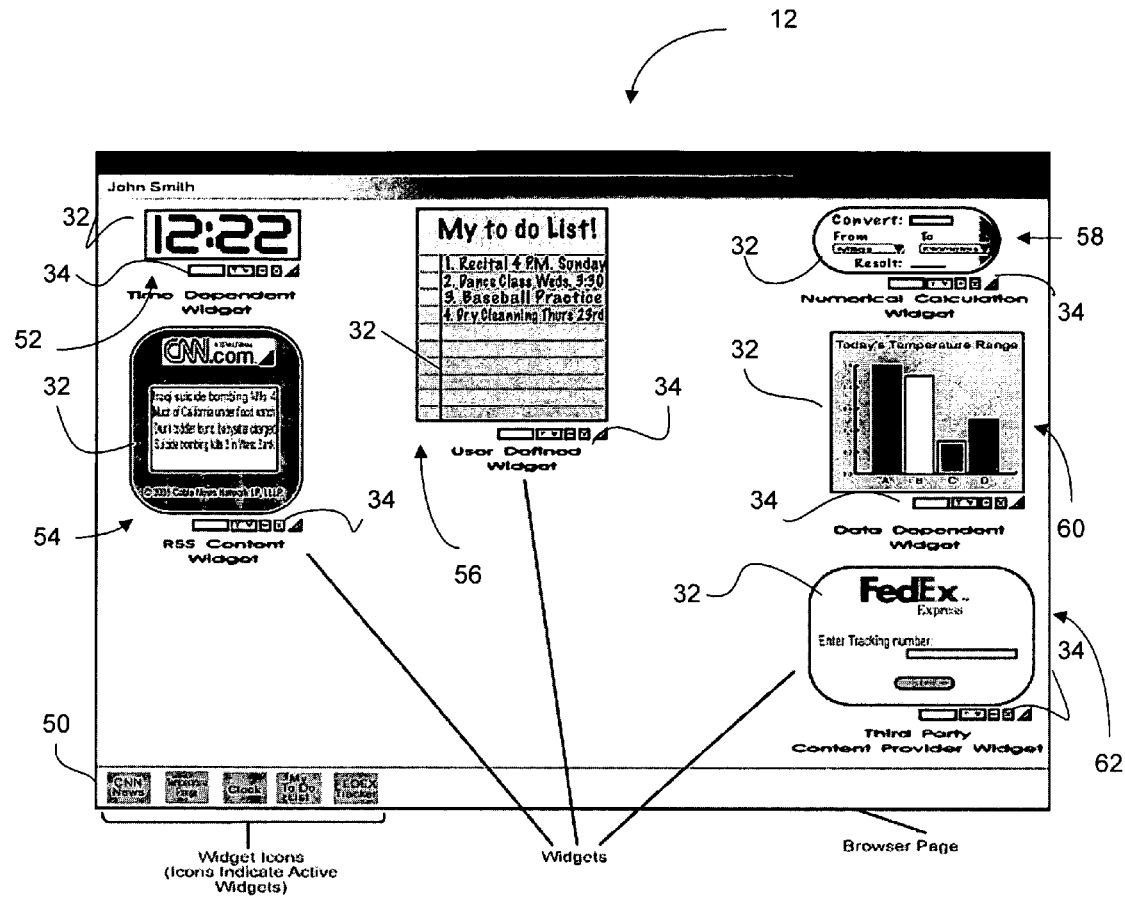
FIG. 6 is an example of a container management module and various associated visual elements.

Turning now to FIG. 6, an example is provided of a graphical user interface 12 having various widgets 28, each having a widget container 30 (not called out). The widget containers 30 may be managed by a container management element 50 which may be used to manage global features of the widget display, including active widgets 28 and how they are positioned within the GUI 12. The container management element 50 may be configured to store all modifications made to the user's widgets (including their positioning and configuration within the GUI 12) in the data store 26 on the server 20. This allows for the system to provide a consistently uniform experience to the user. Moreover, because the data may stored on the server exclusively, the widget 28 user accounts may be device independent in that no matter what computer the user access his widget account from, he will see the most recent configuration of widgets 28.

The container management element 50 may further be configured to display a thumbnail icon of each of the user's active widgets 28 in a list somewhere within the graphical user interface 12. This list may be used by the user to ascertain which widgets 28 are tied to his widget service account, and to activate or deactivate certain widgets 28 stored in the widget container 30.

The widgets 28 displayed in the graphical user interface 12 of FIG. 6 are of many types. The interface 12 includes a time dependent widget 52. The time dependent widget 52 includes container controls 34 and an image element 32 displaying time dependent content. In the example provided, the time dependent widget 52 is a clock widget that displays the current time. Other time dependent widgets 52 may include countdown widgets or reminder widgets. The above example of a time dependent widget may be a web based clock that allows the user to set the time by clicking on the numerals displayed. The clock maintains its accuracy by periodically referencing US government time standards accessible via the web. When there is a time deviation of more than 1 minute the widget application corrects its internal time reference to indicate the correct time. The widget application logic may dictate other behaviors based on time values, such as playing an audio file on the hour announcing the current time, or sending the user an email a preset number of minutes prior to a specified date or time.

FIG. 6 also provides an example of an RSS content widget 54. The RSS content widget 54 includes container controls 34 (as does each widget in the display), and an image element 32. The image element 32 may contain a base image and an interface area that receives RSS content from the server 20 to display on the computing device 10 for the user. In some embodiments, the user may be permitted to select RSS feeds from which RSS widgets 54 may be created. In yet other embodiments, users may be permitted to add sources not listed by the server 20.

Also present in FIG. 6 is a user-defined content widget 56. The user-defined content widget 56 displays data that is provided by the user to the server 20. In the example provided, the user has provided data in the form of a "To Do" list. Other types of user-defined content widgets 56 may be utilized. For example, a user may wish to create a notes widget 56 which allows the user to take and store notes for later review.

FIG. 6 also provides an example of a numerical calculation widget 58. In the example shown, the numerical calculation widget 58 includes an English to metric conversion application that runs within the widget image element 32. Numerical calculation widgets 58 may be of at least two types. A first type of numerical calculation widget allows a user to enter a value and widget returns calculation result—i.e. unit conversions, currency conversions. A second numerical calculation widget allows a user to enters a string of values and specify operation(s) i.e. calculator widget, spreadsheet widget.

Immediately below the numerical calculation widget 58 is a data dependent widget 60. The data dependent widget 60 may be configured to retrieve data at preset intervals and performs actions when a specified condition or conditions are met. These types of widgets allow a user to specify data parameters that define the condition. When the condition is met, a user-selected action may be taken, or the behavior of the data dependent widget 60 may be modified in accordance with the user's instructions. In the example provided in FIG. 7, the data dependent widget 60 is a temperature monitoring widget. It receives measurements from an external peripheral thermometer of the temperature at specified intervals during the day. The widget application may be configured to send a message to Bluetooth enabled air conditioner to begin cooling an area if the temperature reaches a certain level. These types of widgets will be discussed in further detail below in connection with FIGS. 7-11.

FIG. 6 also provides an example of a third party content provider widget 62. The third party content provider widget 62 allows a user to obtain information from a third party provider (i.e., an entity other than the widget service provider). The third party provider may be a publicly accessible data source or it may include a password protected data source. In the case of a password protected data source, the user may specify a password for the data source when configuring the widget 62. This allows the system server 20 to be able to send a request to the third party data provider and gains access to the requested data. The particulars of accessing the third party content will be discussed in further detail below in connection with FIG. 14.

Other types of widgets may also be made available as shown provided in the table below:

RSS Content Widgets

| | |
|---|---|
| News Widget | Displays news story headline and allows user to click link for full story. With RSS example user selects from a list of RSS feed sources or requests news from a specific source. |
| Recipe Widget | Displays recipes for dish or food specified by user. |
| Weather Widget | Displays current and forecast weather conditions for location specified by user. |

User Defined Content Widgets

| | |
|---|---|
| Address Book Widget | Displays list of user defined contacts showing phone, email, address and notes. |
| List Widget | Displays user defined text in the format of a list. |
| Notes Widget | Displays user defined text in the format of an electronic "post-it" note. |
| Task Widget | Displays user defined text in the format of a list of things "To Do" with associated dates and behaviors. When specified date nears defined behaviors are invoked ie send email; change color of text. |

Third Party Content Widgets

| | |
|---|---|
| Dictionary Widget | Displays definition of specified word. Retrieves results from user selected web site i.e. dictionary.com. |
| Directory Widget | Displays phone and address for the person's name entered by user. Accesses third party data source. |
| Email Widget | Monitors specified email account for newly received email and indicates # of unread emails. |
| Package Tracker Widget | Displays current shipping status from shipper (i.e. Fed Express) for user specified tracking number. |
| Search Widget | Displays search results for text string. Retrieves search results from user selected source ie Yahoo. |
| Stock Quote Widget | Displays current stock price and associated data for specified stock symbol. |
| TV Listings Widget | Displays the current and upcoming program listing for specified location. |
| Voicemail Widget | Alerts user of new voicemails for specified phone number and and allows user to hear them. |
| Widget Cam | Displays the current image of the selected or specified webcam. |
| Wikipedia Widget | Displays the Wikipedia results for user specified word/phrase. |
| Yellow Pages Widget | Displays search results for yellow page listings for the specified keyword and specified location. |

Data Dependent Widgets

| | |
|---|---|
| Alarm Widget | Notifies user and performs actions when user defined conditions are met. Conditions may be based on real-time values of external data sources ie temperature sensor or facility entry sensor. |
| Device Status Widget | Displays the current status of an external or system device i.e pump on/off. |
| HVAC System Widget | Allows control of external device such as a heating/air conditioning system. |
| Heart Rate Widget | Displays current heart rate and performs behaviors according to preset limits ie notify nurse's station.. |
| Monitor Widget | Displays current parameters of external data source. Changes visual appearance according to set limits. |

Time Dependent Widgets

| | |
|---|---|
| Birthday Widget | Displays number of days left until user specified birthdate. Behaviors include send email, flash image. |
| Clock Widget | Displays system's current time or time retrieved from external source i.e. Time standards website. |
| Countdown Widget | Displays time left in hours or days for user specified event. Invokes defined behaviors i.e. send an email when event nears. |
| Holiday Widget | Displays number of days left until specified holiday i.e. Christmas or anniversary with customized image. |

-continued

| | |
|---|---|
| Reminder Widget | Displays visual reminder when user specified date arrives. Invokes specified behaviors i.e. send email. |
| Numerical Calculation Widgets | |
| Currency Converter Widget | Converts the amount entered by user from one currency to another as selected by user. |
| Date Calculator Widget | Calculates and displays how many days are left until date entered by user. |
| Units Converter Widget (i.e. MKS to English) | Converts the numerical value entered by user from one measurement unit to another as selected by user. |

Figure 7:
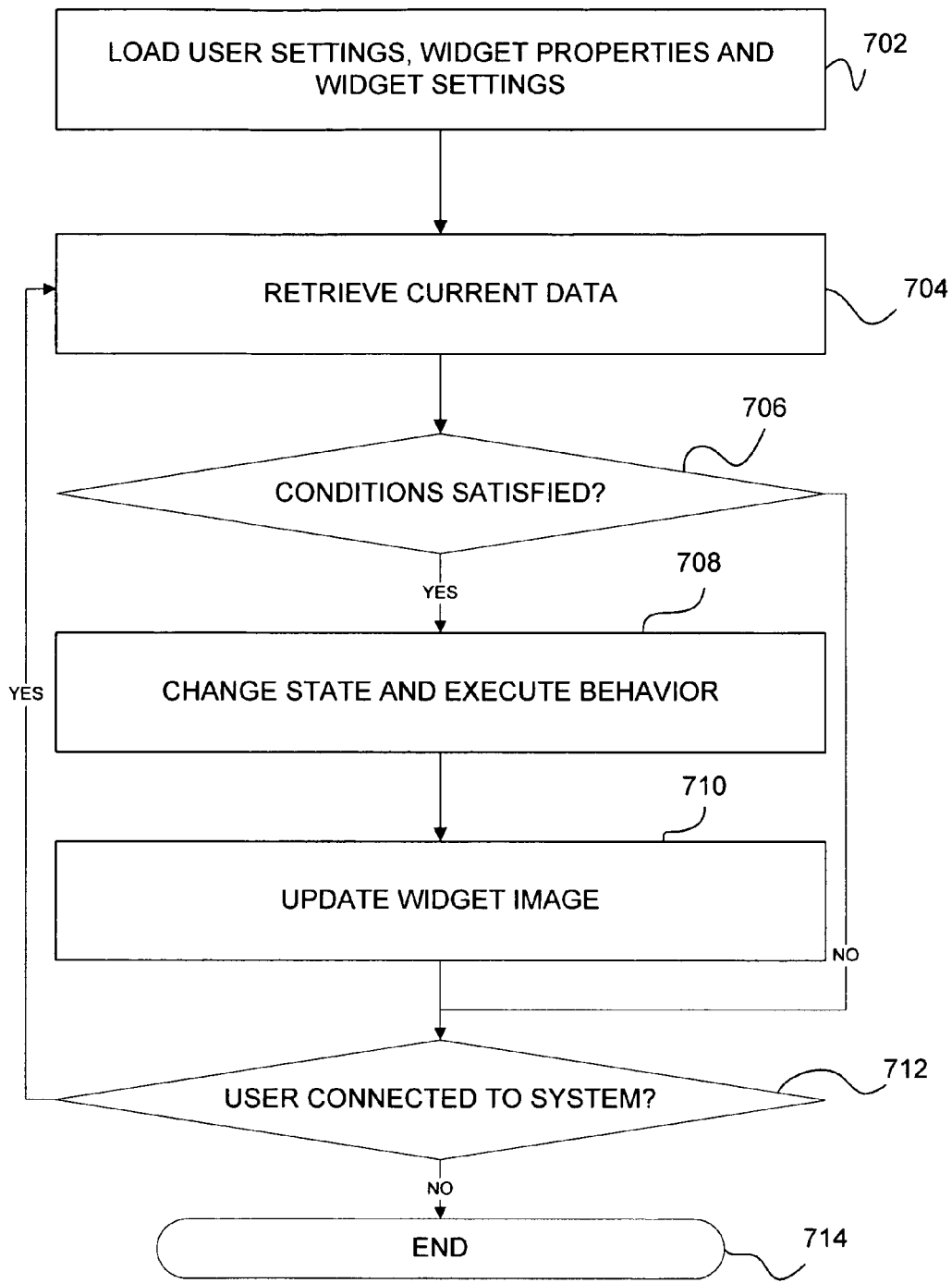
FIG. 7 provides an example of the operation of a data dependent widget.

Referring now to FIG. 7, a more detailed example of the operation of the server 20 in controlling the display of data dependent widget 60 on a user's computer is provided. Beginning block 702, the system server 20 may load user settings, widget properties, and widget settings for the data dependent widget 60. The user settings may include a username and a password for the user account which allows the system store the remaining data and associate it with the user at a later time. The data dependent widget 60 may include widget properties such as user-defined conditions or properties that may be used to affect the behavior of the data dependent widget 60. Next, at block 704, the system retrieves the current data regarding the conditions specified by the user-defined parameters. For example, in the temperature range widget of FIG. 6, the widget parameters may be set to send a request for the temperature every four hours. Once the current data is received, the system determines whether the user-defined condition has been met at decision block 706. If the condition has been met, the widget may change its current state and execute a modified behavior at block 708. In order to show that the state has changed, the widget image may be updated at block 710. The process may then proceed to the second decision block at block 712 user the system checks to see if the data dependent widget 60 is still active and making requests from the system server 20. If, however, the condition is not satisfied during decision block 706, the process may then skip blocks 708 and 710, and instead proceed directly to another decision block 712. At block 712, if the data dependent widget 60 remains in communication with the server 20, the process loops back to block 704 and repeats until the widget is not longer active. When the widget becomes inactive, such as by the user closing the browser within which it is running, or by the user removing the widget from the widget container 30, the process may conclude at termination block 714.

Figure 8:
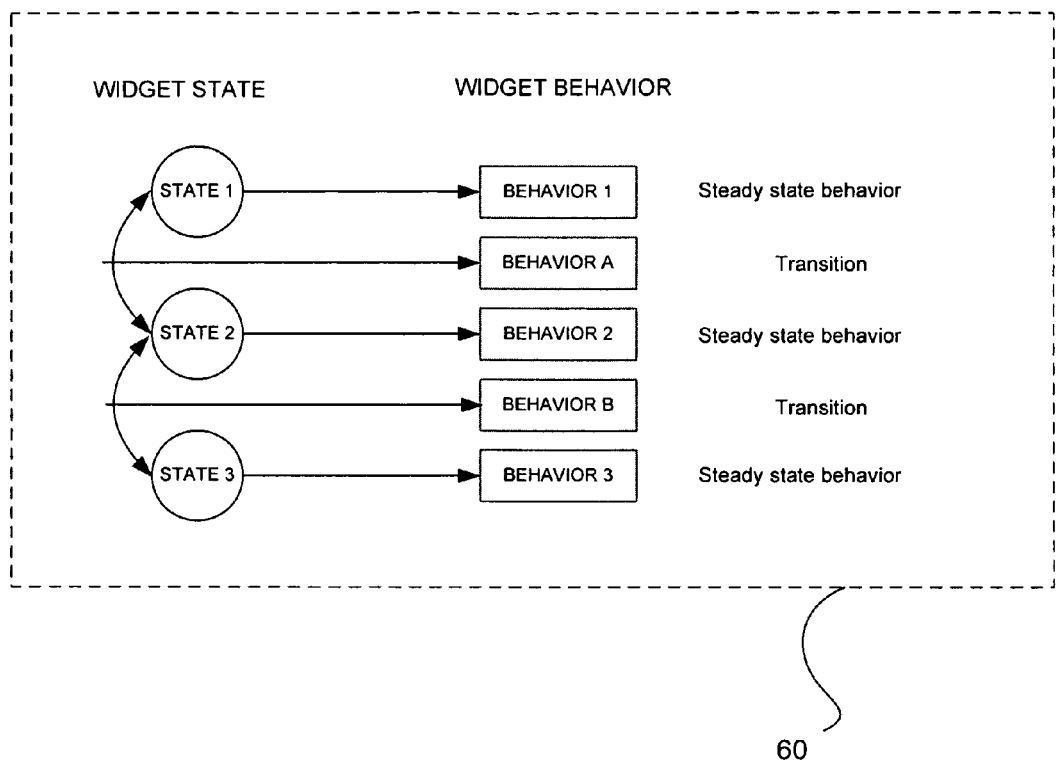
FIG. 8 is a state model of a data dependent widget.

In some embodiments, widget behavior may be determined by the widget's current steady state or a change in state. Behaviors may include (1) sending an e-mail; (2) requesting an HTTP resource (e.g., HTTP Post command); (3) playing a sound; (4) modifying the visual appearance of the widget such as, for example, flashing an image in an alarm widget, displaying a small icon for a reminder widget, or modifying a background color for a countdown widget. Referring now to FIG. 8, a state diagram is provided which illustrates how a data dependent widget 60 may modify its behavior based on the widget state (e.g., measured conditions). With reference to the diagram, three widget states are modeled on the left side of the state diagram. Each widget state maps to a predefined steady state behavior. For example, "State 1" maps to a steady state behavior associated with it called "Behavior 1." State 1 may, for example, call for a Behavior 1 which displays the standard image for the widget 60 and seeks a data update from the system server 20 every five minutes. If the retrieved data satisfies a set of predefined conditions, a change in state occurs for the data dependent widget 60. Thus, in the example provided, if the predefined conditions for State 1 are met, the widget may initiate a separate predefined change of state behavior, Behavior A. In one embodiment, the change of state behavior may cause the server 20 to send an e-mail notification to the user of the change in state of the widget. This change of state behavior allows the user to be notified when the state of the external data received by the widget has changed. This type of configuration may be useful in the context of an alarm widget.

Figure 9:
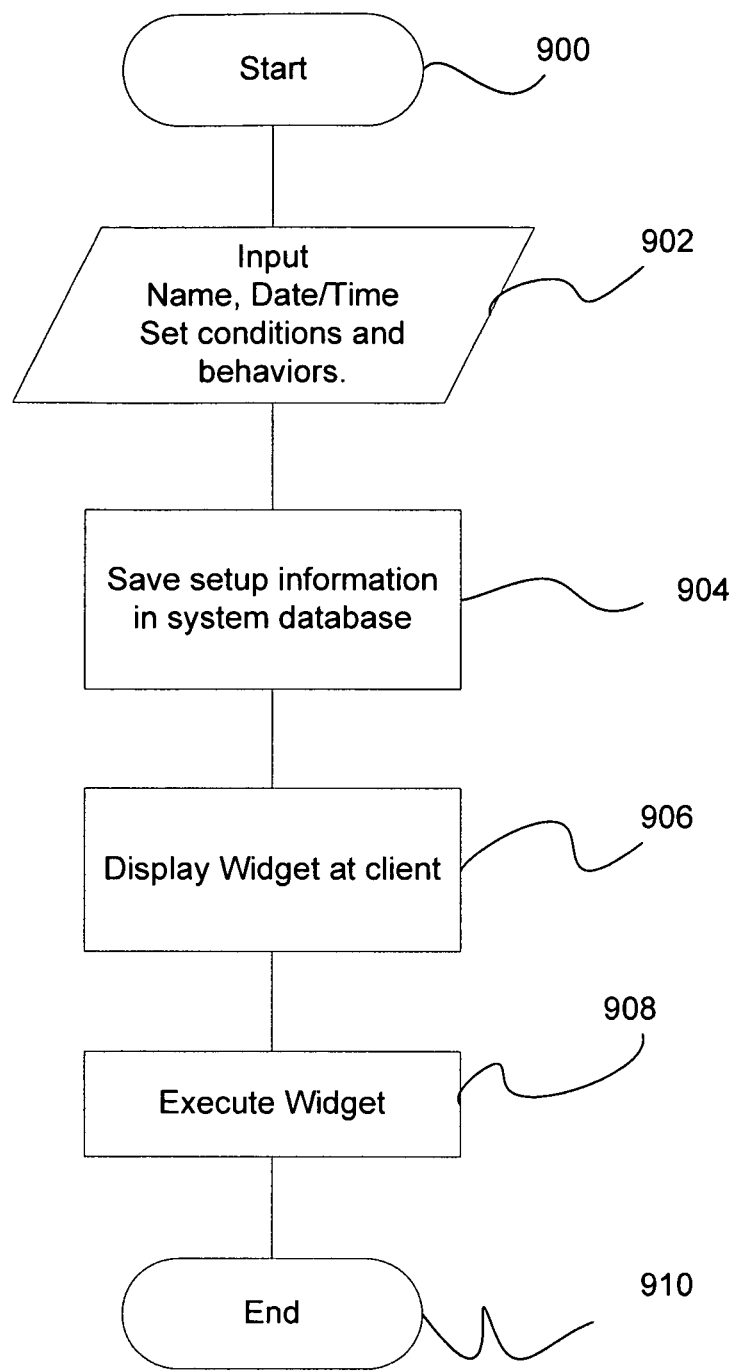
FIG. 9 is a flowchart diagram depicting the process of creating an alarm widget.

FIG. 9 provides an illustration of a process for creating a data dependent alarm widget 60. At block 900, the process begins and proceeds to block 902 where the user inputs the name of the alarm widget 60, the date/time, and the conditions and behaviors associated with the alarm widget 60. Next, at block 904, the input information is stored in the server 20, possibly in the data store 26. The process then moves to block 906, where the alarm widget is downloaded to the client computing device and displayed in the graphical user interface 12 of the computing device 10. Next, the widget is executed at block 908, and remains running (until the process terminates at block 910) as will be described below in FIG. 11.

Figure 10:
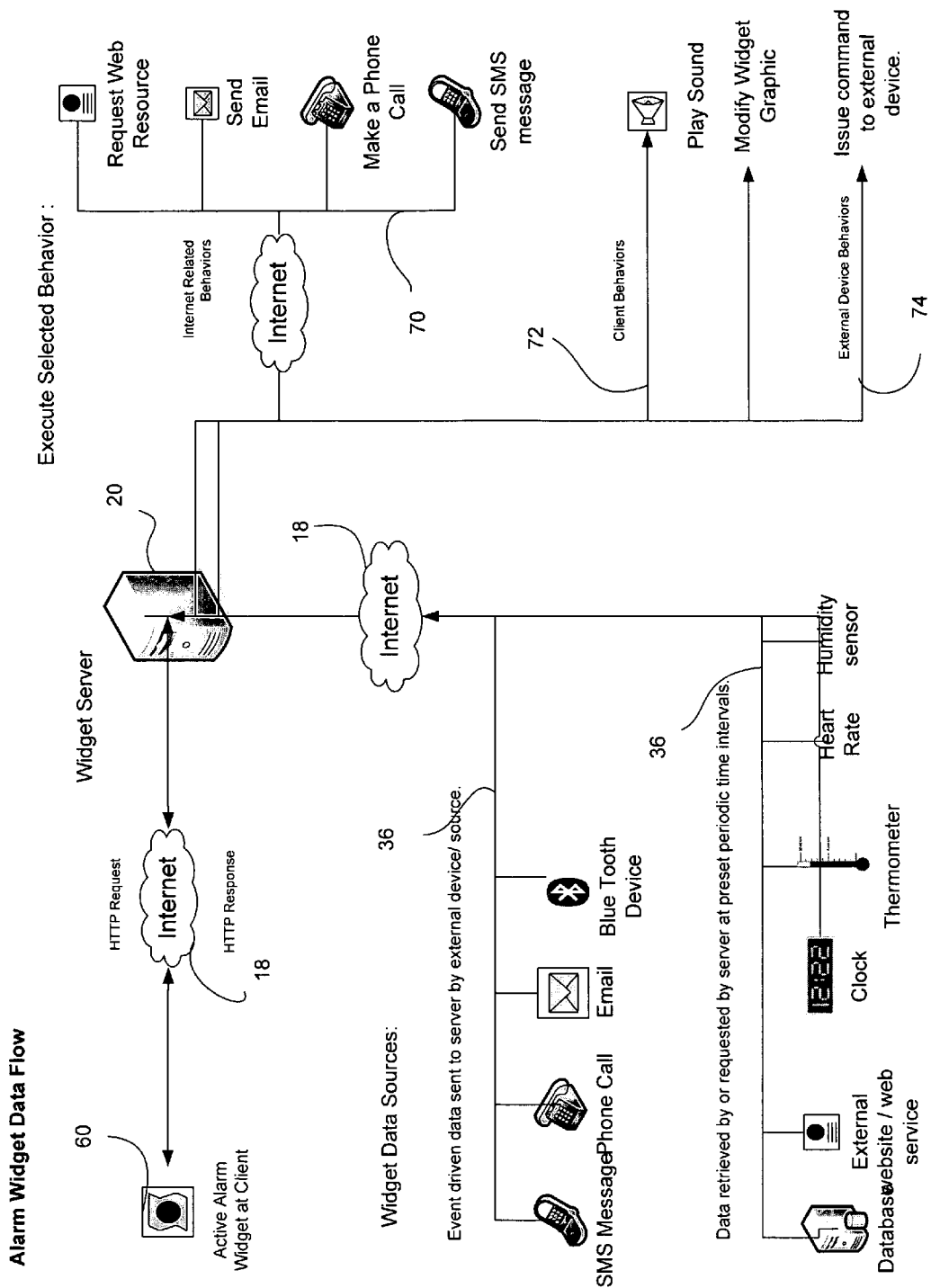
FIG. 10 is a system diagram describing various options available within the system when creating the alarm widget.

The alarm widget process described in FIG. 9 above and in FIG. 11 below may include various possible configurations. FIG. 10 provides an illustration of the various ways in which the alarm widget 60 (which is a type of data dependent widget 60) may be implemented. As shown in FIG. 10, the alarm widget 60 may connect to the server 20 via a network connection 18. The system server 20 may be in communication with various data sources for the alarm widget. The data sources may include real-time external device data 36 from sources such as SMS messages, phone calls, e-mail, or from a Bluetooth capable device or household appliance. The data provided by these data sources may be sent to the server 20 over the Internet or on another network. The real-time data sources may also include data sources that receive periodic requests from the server 20. These data sources may include external databases which may receive SQL queries for data; external websites, clock devices, thermometers, heart rate sensors, humidity sensors, or some other device capable of receiving requests from the server 20.

The alarm widget may be configured to execute selected behavior based on the data received from the data sources 36. In one embodiment, the selected behavior may be an Internet-related behavior 70 such as requesting a web resource, sending an e-mail, placing an IP based phone call, or sending an SMS text message. In response to the received data, certain client behaviors 72 may also be programmed into the data dependent alarm widget 60. For example, the widget 60 may be configured to play a sound notifying the user of a change in state. Alternatively, or in addition, the widget 60 may be configured to modify the widget graphic by causing it to change in its visual appearance such as altering its background color or size or causing it to flash on and off. In still other embodiments, the widget 60 may be configured to modify external device behaviors 74 by sending commands to an external device based on the received data. For example, if the widget is programmed to receive data from a thermostat of an air conditioning unit, the widget may be configured to change state when the temperature exceeds a certain threshold. If the air conditioning unit is Bluetooth enabled, a command to cool the room may be sent from the computing device 10 to the air conditioning device when this occurs.

Figure 11:
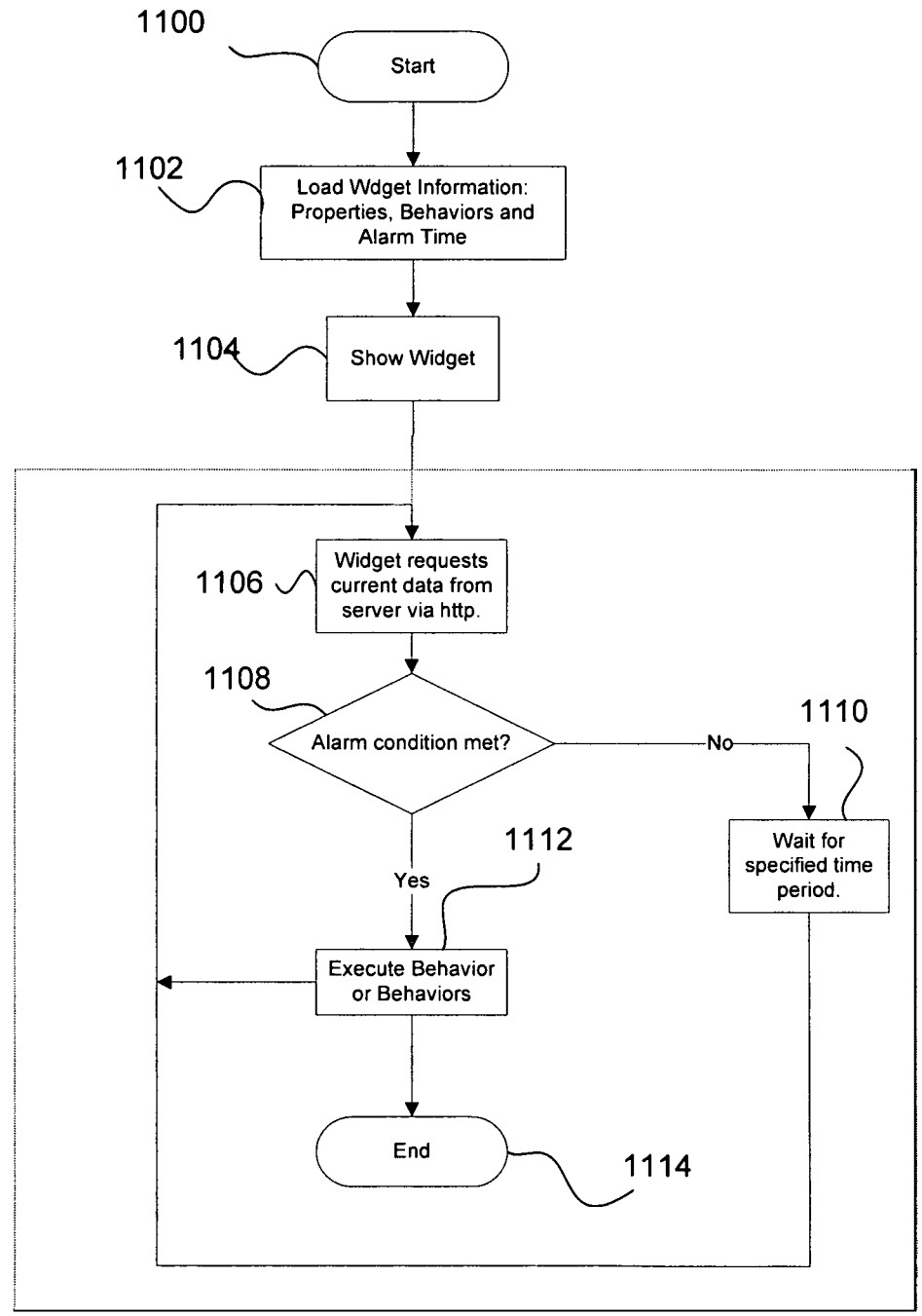
FIG. 11 is a flowchart describing the functionality of an alarm widget.

FIG. 11 provides an illustration of the operation of the alarm widget 60 described in FIGS. 9 and 10 above. At initiation block 1100, the client computer 10 sends a request for an already defined alarm widget 60. At block 1102, the request is received by the server 20 and sent back to the client computer 10 which loads the widget information including properties, behaviors, and alarm conditions into the browser application 16. Next at block 1104, the alarm widget 60 is displayed on the graphical user interface 12 of the browser application 16 on the user's computer 10 at which point the process proceeds to enter a loop that continues until the user logout or some predefined widget behavior dictates otherwise.

The first step in the loop is block 1106, where the widget requests current data, such as real-time data from external sources 36 from the system server 20. This request may be an HTTP request, an FTP request, or some other form of request. Proceeding to block 1108, the system them determines, based on the external data, whether the alarm condition has been met. If not, the widget waits for a specified time at block 1110 and returns to block 1106 where it resubmits its request for current data.

If the alarm condition has been met, at block 1112, the specified behavior or behaviors are executed due to the condition match. If the behaviors specify exiting the loop, the system proceeds to block 1114 and the process ends. Otherwise, the system returns to block 1106 and the loop begins anew.

Figure 12:
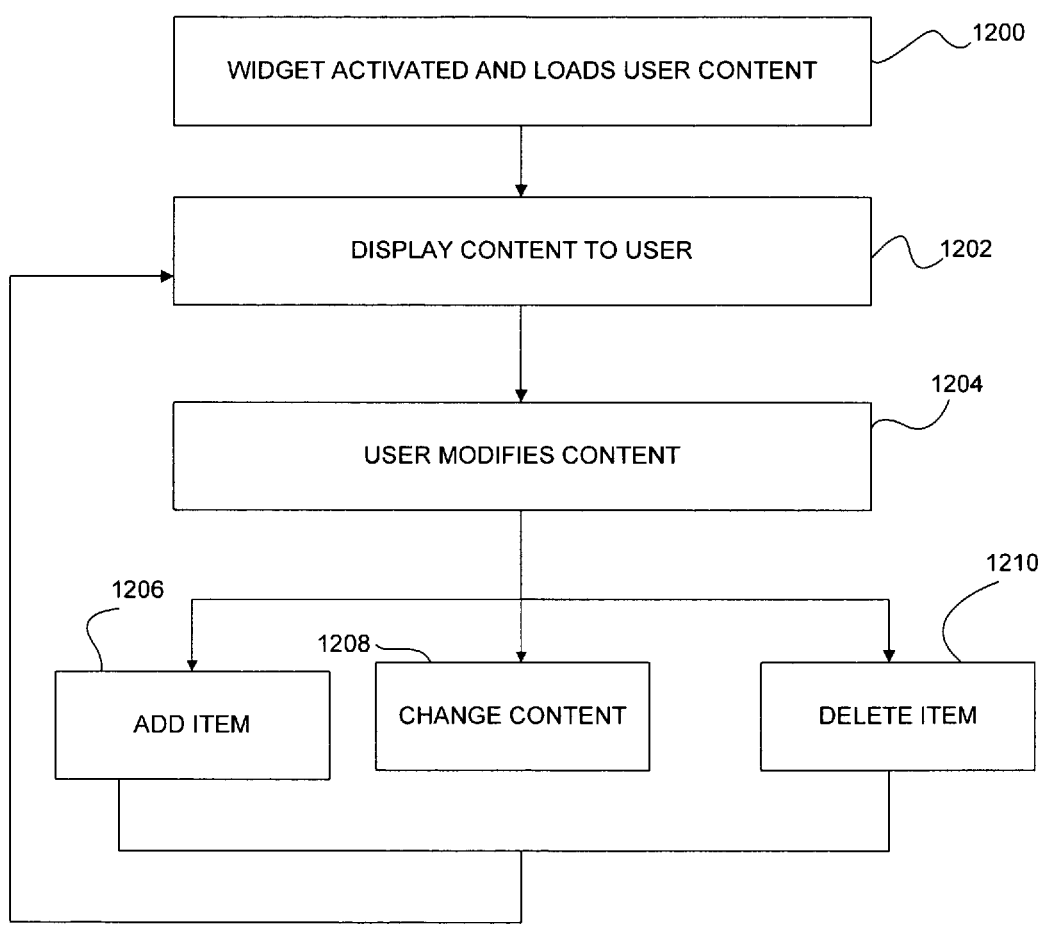
FIG. 12 is a flowchart illustrating the operation of a user-defined content widget.

As discussed above, the widget container may contain various types of widgets. Another type of widget that may be utilized within the widget container 30 is a user-defined content widget. As discussed above, a user-defined content widget 56 is used to receive, store, and display user-defined content. Examples of these types of widgets are notes widgets (which may behave like electronic sticky notes), list widgets (which may simply store a list of inputted item), and the like. FIG. 12 provides an illustrative process performed by a user-defined content according to one or more embodiments. The process begins at step 1200, where the user-defined content widget 56 is activated on the client computing device 10 and loads any content already stored on the server 20 into the widget image element 32 for display to the user. Next, at block 1202, any content already stored with the widget 56 is displayed to the user in the graphical user interface 12. The process then proceeds to block 1204, where the user modifies data in the interactive image element 32.

Depending upon the type of modification, the process may then proceed to some or all of blocks 1206, 1208, and 1210. At block 1206 the system 20 may add an item to the user-defined content if the user-input did the same. Similarly, blocks 1208 and 1210 edit the existing user-defined content in accordance with the changes made by the user at block 1204. Once the changes have been made and stored on the server 20, the process returns to block 1202 where the updated content is displayed to the user.

As discussed briefly above in relation to FIG. 6, the server 20 provides for RSS content widgets 54 which may receive RSS feeds from external data sources. FIGS. 13A-13D provide an illustration of various system configurations that may be used to provide RSS widgets 54 in a widget container 30. Each of FIGS. 13A-13D include a RSS widget 54 which connects over a computer network to one or more of a third-party data provider, the system server 20, and/or a database server 26 to obtain RSS information to display within the image element 32 of the RSS widget 54.

Figure 13A:
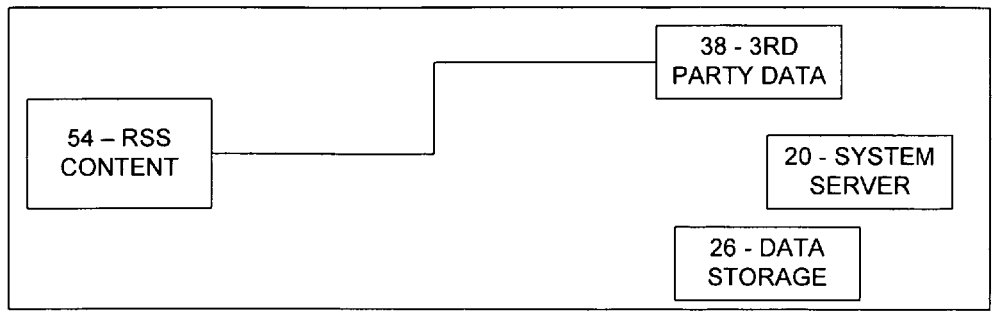
FIGS. 13A-13D illustrate various embodiments for accessing third party content.
Figure 13B:
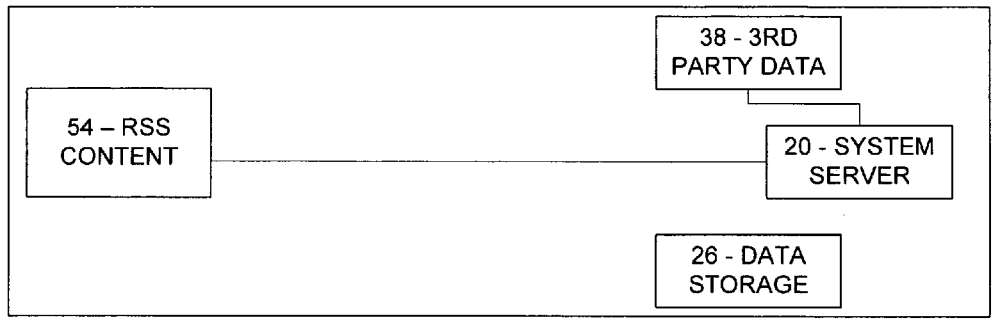

Referring now to FIG. 13A, a direct connection between the widget 54 and the third party data provided 38 is shown. In this example, the widget is configured to connect directly to the content provided, without routing its requests through any other computing device. Although the configuration shown in FIG. 13A may reduce overhead, it may be necessary to forward the RSS feed requests through the server 20 as shown in FIG. 13B. Such a configuration may be necessary or optimal when the third party site requires a security credential available only to the server 20 and not the client computing device.

Figure 13C:
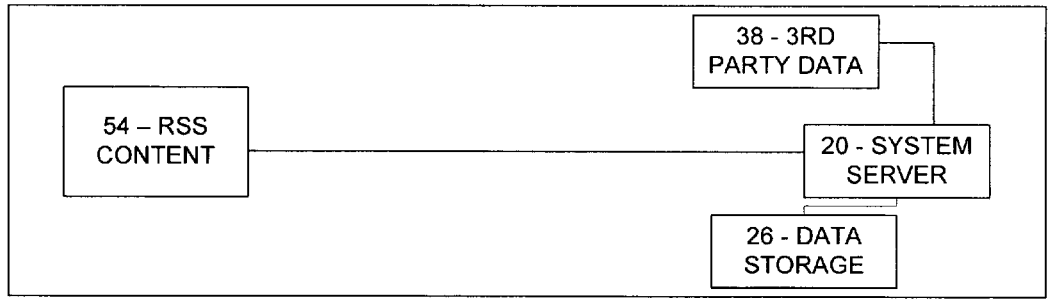
Figure 13D:
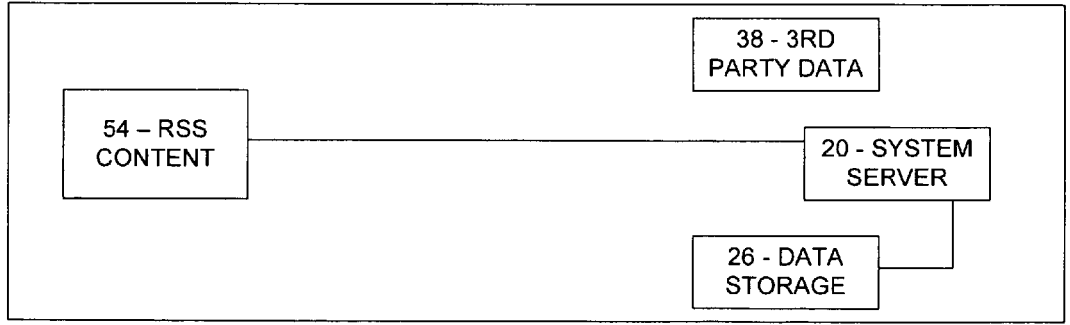

In yet another embodiment, it may be useful to minimize the requests made against the RSS server. For example, if the RSS server is heavily taxed, then server responses may be slow and provide unacceptable performance. FIG. 13C illustrates one embodiment that may be used to address such as situation. The RSS widget 54 sends its request for data to the server 20. The system server 20 first may check whether the latest RSS feed is already stored in the local data storage 26. If it is, it may update the data in the RSS widget 54 and send it back to the client computer 10. If the latest RSS feed is not stored in the database 26, the system 20 may then retrieve the updated data from the RSS server and store it in the database 26 before sending it back to the client computer 10. Finally, in FIG. 13D, the RSS widget 54 (or possibly some other third party content provided widget 60) may request data that is already stored locally on the database server 26. In these instances, the system server 20 may serve as a proxy for the request, but no request will be forwarded to a third party server.

Figure 14:
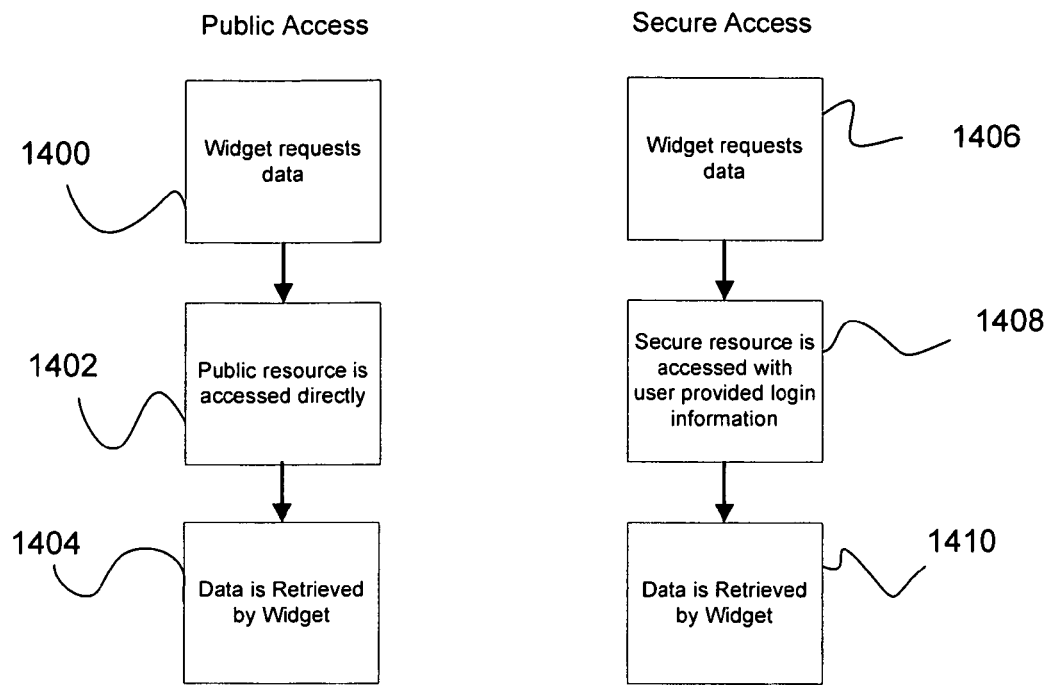
FIG. 14 provides examples of how third party content widgets may access publicly accessible and secured content.

As noted above, a third party content provider widget 62 allows a user to obtain information from a third party provider (i.e., an entity other than the widget service provider). The third party provider may be a publicly accessible data source or it may include a password protected data source. FIG. 14 illustrates the different processes that may be utilized in accessing public and protected third party content.

FIG. 14 includes two flowcharts. The first flowchart describes how a widget (or a widget service provider) may access publicly accessible third party content. At block 1400, the widget request data from the third party content provider. Next, at block 1402, the public resource is accessed directly by the third party content provider widget 62. Upon accessing the public resource, the widget 62 then proceeds to retrieve the desired data at block 1404.

The second flowchart in FIG. 14 illustrates a process by which the third party content provider widget 62 may access protected third party data. The process begins at block 1406 with the widget 62 requesting data from the protected content source. Next, at block 1408, the widget 62 accesses the protected source by including in the request user provided login information. Next, at block 1410, the widget 62 retrieves the requested data and returns it to the user for viewing.

Figure 15:
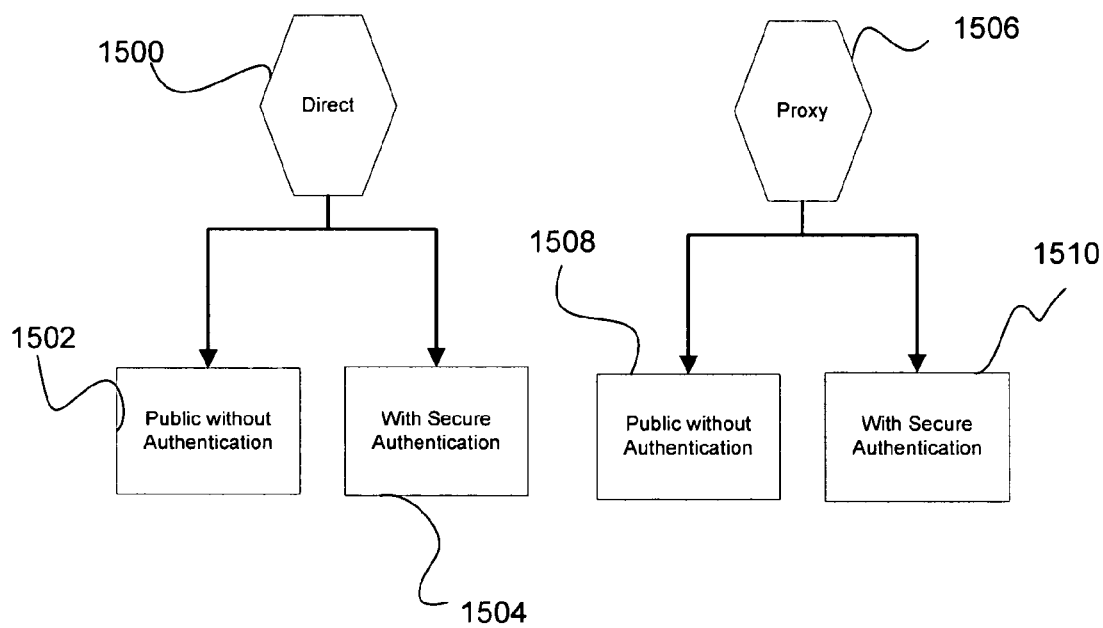
FIG. 15 provides an illustration of four types of third party content provider widgets.

As discussed above, the third party content provider widgets 62 may access third party content in a variety of ways. FIG. 15 provides an illustration of the four types of third party content provider widgets 62 that may be available through a widget service provider. As shown in FIG. 15, third party content provider widgets 62 may be characterized as direct 1500 or proxy 1506. Direct 1500 third party content provider widgets 62, which access third party sites directly, may access a public or unprotected site without authentication 1502, or they may access a protected third party site with authentication 1504. Similarly, proxy access widgets 1502, which utilize a proxy such as server 20, may access third party sites either without authentication 1508 or with secure authentication 1510. Thus, third party content provider widgets 62 are sufficiently flexible to be configured to access various third party websites having assorted access requirements.

It will be understood by those of skill in the art that numerous and various modifications can be made without departing from the spirit of the present invention. Therefore, it should be clearly understood that the forms of the invention are illustrative only and are not intended to limit the scope of the invention.

What is claimed is:

1. A widget service system for defining and delivering a user modifiable visual element, the system comprising:
   a data storage system comprising a computer processor configured to store visual element defining data in a data storage, the data comprising:
      image data including a base image component and other image components;
      user-defined data including alphanumeric data representing information to be conveyed in the defined visual elements; and
      real-time data indicative of current conditions;
   a client definition interface configured to receive input from a client computing device indicative of a user selection of at least some of the image data, the user-defined data, and the real-time data to be associated with the visual element;
   a generation module configured to generate the visual element based on the user-selected visual element defining data; and
   a network interface module configured to receive requests from the client computing device related to the generated visual element, and send the generated visual element that is responsive to the request,
   wherein the system is operative to define and deliver to the client computing device independent of the operating system of the client computing device making the requests.

2. The system of claim 1, wherein the generated visual element is a widget, and wherein the system is operative to define and deliver the widget to the client computing device without installing a widget application on the client computing device.

3. The system of claim 1, wherein the widget is capable of display on a plurality of client computing devices, and wherein the visual element defining data is delivered from the widget service system to each of the plurality of client computing devices.

4. The system of claim 3, wherein the widget is a time dependent widget configured to perform an action based on retrieved time data.

5. The system of claim 3, wherein the widget is a numerical calculation widget.

6. The system of claim 3, wherein the widget is a user defined content widget.

7. The system of claim 3, wherein the widget is a third party content widget.

8. The system of claim 3, wherein the widget is a data dependent widget configured to periodically receive data, and wherein the data dependent widget is further configured to perform an action based on the received data.

9. The system of claim 8, wherein the data dependent widget is configured to receive user input data, the user input data being indicative of a condition, and wherein the data dependent widget is configured to perform an action when the condition is met.

10. The system of claim 7, wherein the third party content widget is configured to periodically request information from a content provider and display the received information within an interactive element of the widget.

11. The system of claim 10, wherein the third party content comprises a webcam image.

12. The system of claim 10, wherein the third party data is weather data.

13. A computer-implemented method of defining and delivering a visual element in a computer network, the method comprising:
   storing visual element defining data, the data comprising:
      image data including a base image component and other image components;
      user-defined data including alphanumeric data representing information to be conveyed in the defined visual elements; and
      real-time data indicative of current conditions;
   receiving input from a client computing device indicative of a user selection of at least some of the image data, the user-defined data, and the real-time data to be associated with the visual element;
   generating the visual element based on the user-selected visual element defining data; and
   receiving requests from the client computing device related to the generated visual element; and
   sending the generated visual element defining data that is responsive to the request,
   wherein the generated visual element is defined and delivered to the client computing device independent of the operating system of the client computing device making the requests.

14. The method of claim 13, wherein the generated visual element is a widget, and wherein the widget is defined and delivered to the client computing device without installing a widget application on the client computing device.

15. The method of claim 13, wherein the widget is capable of display on a plurality of client computing devices, and wherein the visual element defining data is delivered via the computer network to each of the plurality of client computing devices.

16. The method claim 15, wherein the widget is a time dependent widget.

17. The method of claim 15, wherein the widget is a numerical calculation widget.

18. The method of claim 15, wherein the widget is a user defined content widget.

19. The method of claim 15, wherein the widget is a third party content widget.

20. The method of claim 15 further comprising:
   periodically receiving data by the data dependent widget; and
   performing an action based on the received data.

21. The method of claim 20, wherein the received data is user input data and the user input data is indicative of a condition, and wherein the data dependent widget is configured to perform an action when the condition is met.

22. The method of claim 19, wherein the third party content widget is configured to periodically request information from a content provider and display the received information within an interactive element of the widget.

23. The method of claim 22, wherein the third party content comprises a webcam image.

24. The method of claim 22, wherein the third party data is weather data.

25. The system of claim 3, wherein the widget is a data dependent widget configured to periodically receive data, and wherein the data dependent widget is further configured to change its state on the received data.

26. The method of claim 15 further comprising:
periodically receiving data by the data dependent widget; and
changing the state of the widget based on the received data.

27. The system of claim 1, wherein the generated visual element is a widget, and wherein the widget is defined and delivered to the client computing device without installing a widget application in an operating system of the client computing device.

28. The system of claim 1, wherein the system further comprises one or more computing devices, the computing devices comprising computer hardware.

29. The method of claim 13, wherein the step of storing visual element defining data is performed by a computer system comprising computer hardware.

30. The method of claim 29, wherein the step of sending the generated visual element defining data that is responsive to the request is performed by a computer system comprising computer hardware.

* * * * *